March 7, 1967  B. E. RASMUSSON ET AL  3,307,517
DRY COATER FOR CONFECTIONS AND THE LIKE, AND VALVE
MECHANISM USED THEREIN
Filed Jan. 28, 1965  5 Sheets-Sheet 1

INVENTORS
BEN E. RASMUSSON
LEWIS W. BUSCH, JR.
BY Graybeal, Cole & Barnard
ATTORNEYS March 7, 1967 B. E. RASMUSSON ET AL 3,307,517
DRY COATER FOR CONFECTIONS AND THE LIKE, AND VALVE
MECHANISM USED THEREIN Filed Jan. 28, 1965 5 Sheets-Sheet 5

INVENTORS.
BEN E. RASMUSSON
LEWIS W. BUSCH, JR.
BY
Grayheal, Cole & Barnard
ATTORNEYS United States Patent Office 3,307,517
Patented Mar. 7, 1967

3,307,517
DRY COATER FOR CONFECTIONS AND THE LIKE, AND VALVE MECHANISM USED THEREIN
Ben E. Rasmusson, 915 1st Ave. S., Kent, Wash. 98031, and Lewis W. Busch, Jr., Seattle, Wash.; said Busch assignor to said Rasmusson
Filed Jan. 28, 1965, Ser. No. 428,691
15 Claims. (Cl. 118—421)

The present invention relates to mechanisms and techniques for coating of confections and the like, for example frozen confectionary products such as coated or uncoated ice cream bars, with a coating of dry particulate material. More specifically, the dry coating mechanisms of the present invention relate to the coating of a series of confections or the like with a dry particulate material, wherein the coating operation involves progressive conveyance of the confections through forming stages and thence through a dry coating stage wherein the newly formed confections are immersed in a bed of the dry particulate material, as distinguished from conventional dry coating operations wherein the newly formed confection receives a dry particulate material coating applied thereto by a means agitating the particulate material and propelling the same against the surface of the confection.

A typical agitator type dry coating mechanism is shown in Parry et al. U.S. Patent No. 2,710,588. Another dry coater mechanism, currently in wide commercial use and having a mode of operation similar to the Parry et al. mechanism is known as the Fulton dry coater, marketed by Fulton Engineering Co., Inc., Long Island City, N.Y., which employs a rotating pair of impellers to convey the particulate material across the path of travel of a moving bank of frozen confections and to throw the particulate material against the sides of the frozen confections and thereby accomplish a coating thereof wtih the particulate material. Agitator type dry coater mechanisms, such as the Parry et al. machine and the Fulton dry coater, have several disadvantageous characteristics. In installing an agitator type dry coater on commonly used automated frozen confection forming equipment such as the Vitaline (an in-line machine marketed by Vitafreze Equipment, Inc., a subsidiary of FMC Corporation), the equipment has to be substantially modified structurally in order to provide adequate room for the relatively wide agitator type dry coater mechanism. In addition, the agitator type dry coater mechanism is itself relatively rather complicated and expensive, and constitutes a major additional investment for automated frozen confectionary machine operators if they desire to give the equipment the capability of producing a dry coated product. Further, the particulate material applied by an agitator type dry coater must be rather small as to particle size in that relatively large particles will not stick to the confection surface, or are knocked off the surface by subsequently applied particles, because the particles are introduced to the confection surface at a substantial velocity. As a related disadvantage of conventional agitator type dry coaters, a "shadow" effect is encountered which tends to render the extent of coating of the various surfaces of the confection uneven, in that the particles are thrown against the confection surfaces primarily from only two sides so that while the broad faces of the confections (in the case of ice cream bars) acquire a substantial material coating, the narrow faces and the base face thereof receive less coating material. Dry coaters of the agitator type are also relatively complicated to clean and exhibit clogging tendencies, particularly with certain types of pre-dip coating materials.

One basic reason dry coaters for frozen confections have been of the agitation type, rather than the immersion type, is that a newly formed frozen confection, especially a confection having a newly formed, moist, semifluid exterior coating (e.g., chocolate) has a quite delicate surface which is easily upset or "skinned off" if the newly formed confection is simply plunged into a bed of dry particulate material. It is a basic feature and purpose, and primary advantage, of the dry coating technique of the present invention that newly formed, moist, semi-fluid exterior coatings can be dry coated by immersion in a bed of dry particulate material without undergoing upset or skinning off of the delicate confection surface. Other features and advantages of the present invention are that dry coating of the confection is accomplished with a full coverage of all surfaces of the confection, and that dry coating can be accomplished over a much greater range of coating material particle sizes, and with a greater degree of material pickup (i.e., dry coating average thickness) than is possible by agitator type dry coating. Yet other objects and advantages of the present invention are to provide an immersion type dry coater mechanism for use with automated confection forming equipment which is easily and quickly installed without major modification of the existing equipment, which is of itself relatively inexpensive, which is easily dismantled and reassembled as for cleaning, which does not clog, and which can effectively use essentially all of the dry particulate material fed to it without recycling of the material or discard of the material at the end of each production run.

Yet other and more specific features and advantages of the immersion type dry coating mechanism of the present invention involve the provision in such mechanism of an upwardly open container for a bed of particulate material, which container comprises plug means standing upwardly from the bottom of the container, within the bed of particulate material, the plug means being arranged to be downwardly retractable in synchronism with movement of a bank of confections or the like into the bed of material, so that upon progressive withdrawal of such plug means downwardly within the container there is a simultaneous progressive movement of the bank of confections into the bed of material in the container, such movement of the plug means and the bank of confections in the bed of particulate material being with the plug means and the bank of confections in closely spaced relation, so that at the downwardmost position of the bank of confections in the container most of the space in the bed of material initially occupied by said plug means is then occupied by said bank of confections and the material in the container closely surrounds and contacts the surface of each such confection, but without each confection laterally moving the particulate material to any great extent. As a result of this correlation of movement of a retractable plug means in the bed of particulate material and the movement of the bank of confections into the bed of material, the confections become immersed in the bed of particulate material without substantial lateral displacement of the material in the container and without substantial upset of the delicate surfaces of the confections.

A further facet of the present invention pertains to the dry material feeding mechanism here disclosed in conjunction with an immersion type dry coater. Specifically, such feeding mechanism is expressely designed for metered delivery of a dry particulate material from a storage means at an initial location, to a utilization means at another, generally horizontally related location, such utilization means being in this case the container of an immersion type dry coater. Such feeding mechanism comprises a fixed outer casing and a rotatable tubular valve member with respective end-placed slot-like openings, and with particulate material transfer from one such opening of the tubular valve member to the other such opening by selectively controlled axial delivery of a pneumatic medium to such tubular valve member. In the context of the present invention, it is by such feeding mechanism that the bed of particulate material in the dry coater container is maintained at a substantially constant level, even though there is only a small amount of clearance above the container. Operationally, such feeding mechanism delivers a metered amount of particulate material into the container alternately with the dipping of each bank of confections into the bed of material.

These and other objects, features and advantages of mechanisms and modes of operation characteristic of the present invention will be apparent from the following description of certain typical and therefore non-limitive forms thereof, taken together with the accompanying illustrations thereof, wherein like letter and numeral designations are employed to denote like parts, and wherein.

Typical forms of a dry coater and associated particulate material feeding mechanism are shown in FIGS. 1–5, as installed on a typical conventional automatic frozen confection forming equipment, a Vitaline Model 6 being shown by way of example as the conventional equipment involved. The Vitaline Model 6 is an in-line frozen stick confection machine, manufactured and marketed by Vitafreze Equipment, Inc., a subsidiary of FMC Corporation, Sacramento, California.

Figure 1:
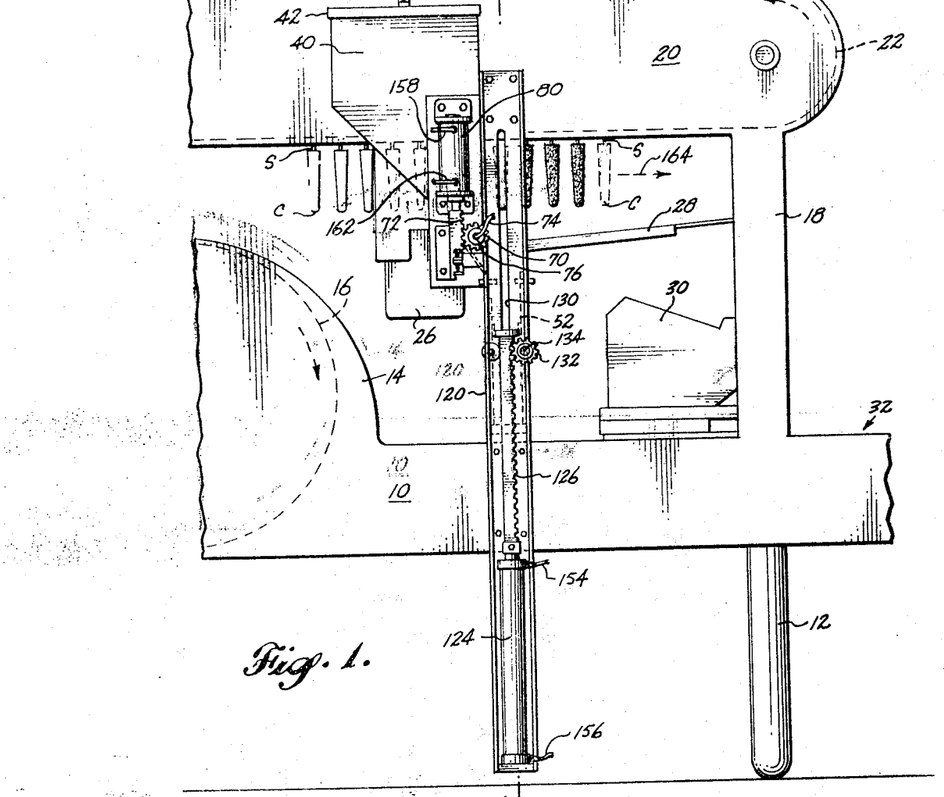
FIG. 1 is a fragmentary, somewhat simplified, side elevational view of the coating and discharge portions of a Vitaline automated frozen confection forming equipment, with a dry coater and associated feeding mechanism according to the present invention installed thereon.
Figures 2, 3, 4, 5:
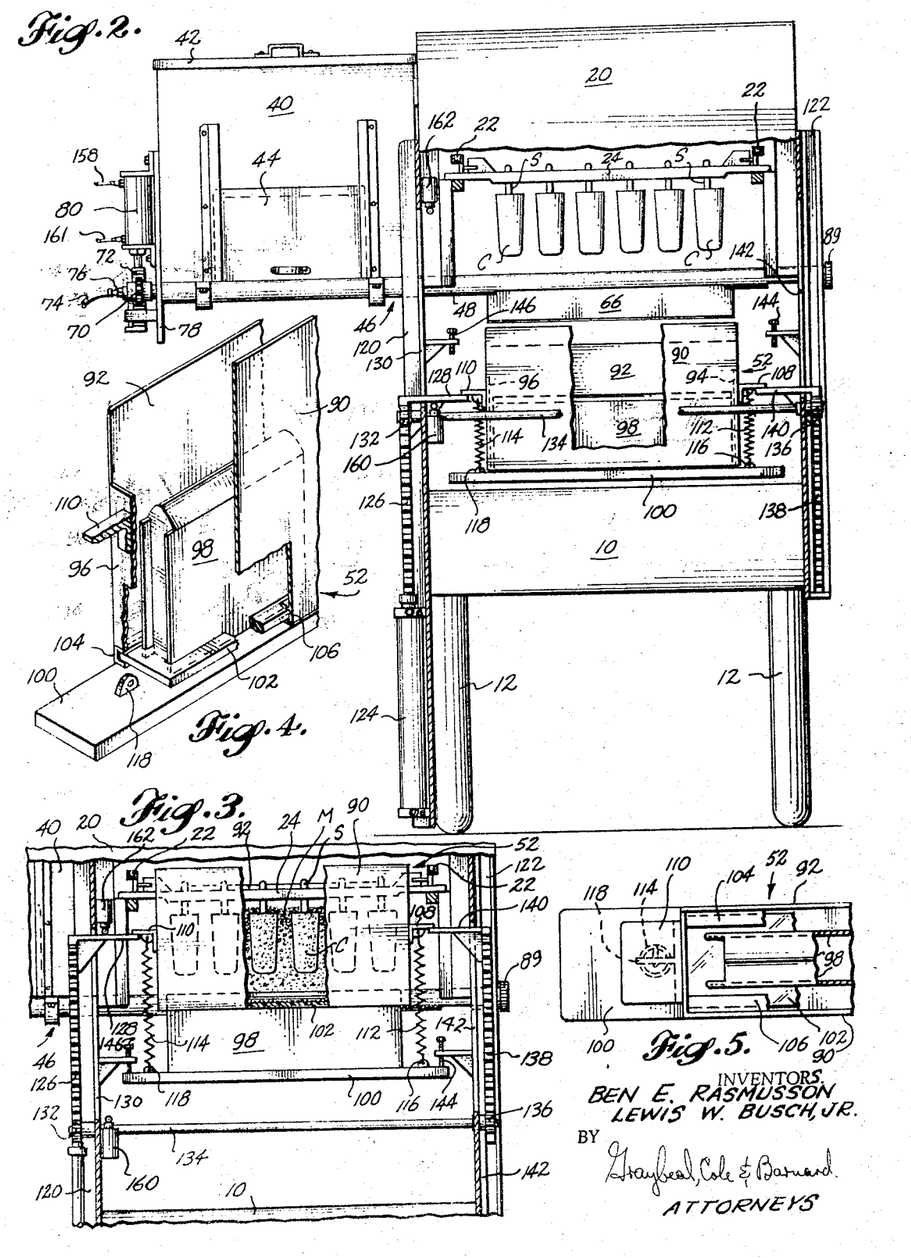
FIG. 2 is a view in vertical cross-section, taken substantially along line 2—2 of FIG. 1, and with certain portions broken away, the container of the dry coater mechanism being shown in its lowermost position.
FIG. 3 is a fragmentary view corresponding to the view of FIG. 2, also with certain portions broken away, and showing the container of the dry coater in its uppermost position.
FIG. 4 is an isometric, fragmentary view, with certain portions broken away for clarity of illustration, and on a larger scale, of the material container shown in FIGS. 1–3.
FIG. 5 is a fragmentary top plan view of the mechanism shown in FIG. 4.

As will be understood by those in the art, FIGS. 1–3 show only certain pertinent portions of a Vitaline machine. These illustrated portions, shown in a somewhat simplified manner for clarity and simplicity, include a main frame 10 supported by legs 12, which main frame 10 includes a main conveyor assembly, the discharge end of which is generally indicated at 14, the main conveyor assembly comprising a laterally spaced pair of mold conveyor chains, schematically designated at 16, which carry a series of mold strips (not shown), each made up of six molds in which a bank of confections is formed. Supported above main frame 10 by upright frame members, two of which are shown at 18, is an extractor bar conveyor section, generally designated at 20, coursed by a laterally spaced pair of extractor bar conveyor chains schematically designated in FIG. 1 at 22, carrying a series of blade type, laterally arranged extractor bars, one of which is shown at 24 (FIGS. 2 and 3).

In general, the overall layout and manner of operation of the partially illustrated conventional Vitaline machine are as follows. The mold conveyor chains 16 carry the bank of molds in each mold strip successively from a filler section, through a brine freezing section, past a stick inserter machine where a stick S is placed in each mold to be embedded therein as the liquid confection in the mold freezes, thence to a defrost dip tank wherein each frozen confection C is loosened in its mold, and the sticks S of a bank of confections are grasped by the gripper blades of an associated extractor bar 24 being carried along the upper, extractor bar conveyor section 20 by conveyor chains 22. The sticks S of a bank of confections C, being then securely held by the extractor blades of an extractor bar, are then withdrawn relatively upwardly from the molds and the newly formed but as yet uncoated confections C move in line along a path of travel under the extractor bar conveyor section 20, as shown in FIG. 1. A function of the extractor bar conveyors 22 and associated extractor bars 24 is to extract the confections C from the molds, convey the confections to a chocolate dip section comprising a chocolate dip tank 26, and then over a chocolate recovery board 28 to a bagger section comprising a bag magazine assembly 30 where the confection sticks S are released from the extractor bars by a gripper blade trip assembly (not shown) which functions to release the blades of the extractor bar from the confection sticks, dropping the confections into respective bags in the bag magazine assembly or wrapper assembly 30, from whence the bagged or wrapped confections pass to a heat sealer unit and then to discharge conveyor means in the discharge section generally indicated at 32 (FIG. 1).

As will also be understood by those in th art, the conventional automated frozen confection forming equipment discussed above is characterized by in-line movement of progressive banks of frozen confections, with the banks of confections moving in an indexed manner, i.e., with a given bank of confections moving forwardly to the position previously occupied by the bank of confections preceding it, with a momentary dwell occurring after each stepwise movement, and with each extractor bar undergoing a so-called dipper cycle or downward then upward stroke when each extractor bar and its bank of frozen confections C is in dipping position over chocolate dip tank 26, the continued forward movement of the product laden extractor bars after dipping carrying the banks of confections over the chocolate recovery board 28 in a series of stepwise horizontal movements.

The present invention adds to this conventional automated frozen confection forming equipment a dry coater section generally comprising the components next discussed. Mounted at one side of the extractor bar conveyor section is a storage means, in the form of a hopper 40, for the dry particulate material M to be applied to the dip coated frozen confections. Hopper 40 suitably has a removable cover 42 for filling and a movable side door 44 for cleaning (FIG. 2). In its lowermost portion, hopper 40 joins one end of what can be generally termed a tubular valve means 46, such tubular valve means 46 being comprised of a non-rotative tubular outer casing 48 and a rotatable tubular valve member 50 (FIGS. 6-18).

Figures 6, 7, 8:
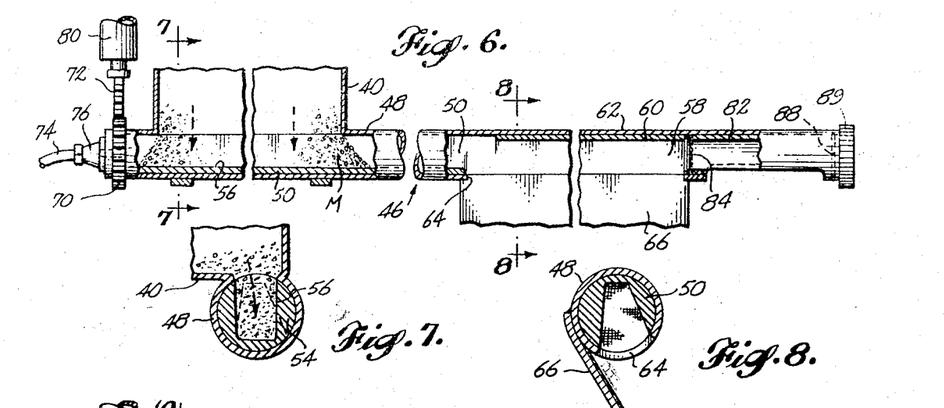
FIG. 6 is a view in side elevation, on an enlarged scale with certain portions broken away for clarity of illustration, of the tubular valve means and associated mechanism of the equipment shown in FIGS. 1–3, with the rotatable tubular valve member being shown in its fill-discharge position.
FIG. 7 is a view in lateral cross-section of the structure shown in FIG. 6, taken substantially along line 7—7 thereof.
FIG. 8 is a further view in lateral cross-section of the structure shown in FIG. 6, taken substantially along line 8—8 thereof.
Figures 9, 10, 11, 12:
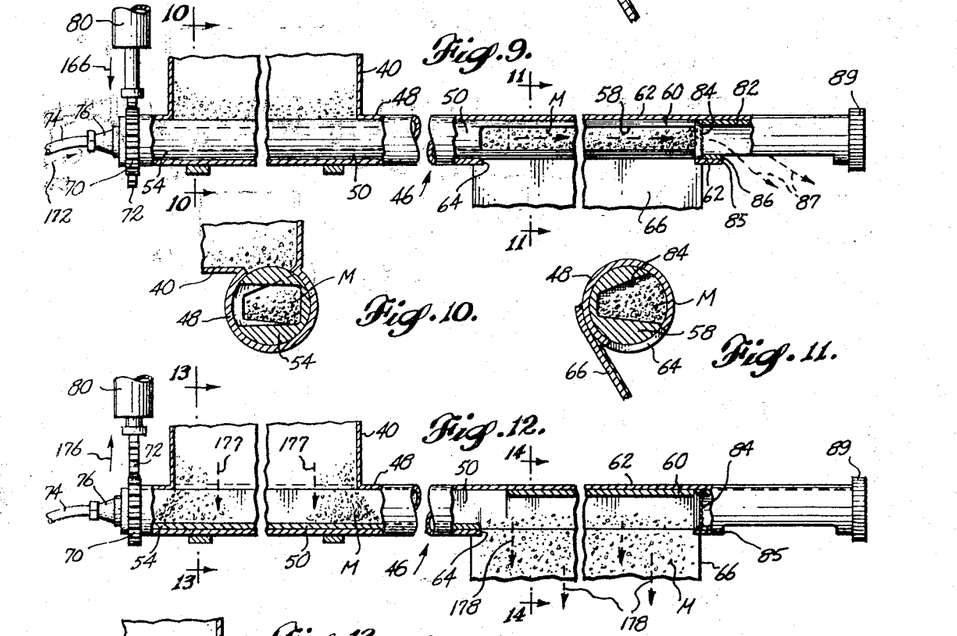
FIG. 9 is a view of the tubular valve means shown in FIG. 6, with the tubular valve member in its second rotational position where the fill and discharge openings thereof are closed.
FIG. 10 is a view in lateral cross-section taken substantially along line 10—10 of FIG. 9.
FIG. 11 is a further view in lateral cross-section of the structure shown in FIG. 9, taken substantially along line 11—11 thereof.
FIG. 12 is a further view of the tubular valve means and associated structure as shown in FIGS. 6 and 9, with the rotatable tubular valve member thereof returned to its fill-discharge position.
Figure 13:
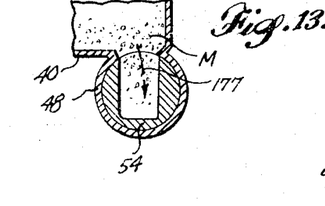
FIG. 13 is a view in lateral cross-section taken substantially along line 13—13 of FIG. 12.
Figure 14:
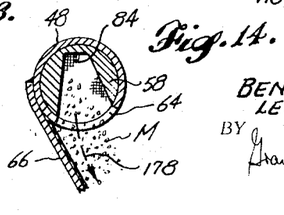
FIG. 14 is a further view in lateral cross-section, taken substantially along line 14—14 of FIG. 12.
Figure 15:
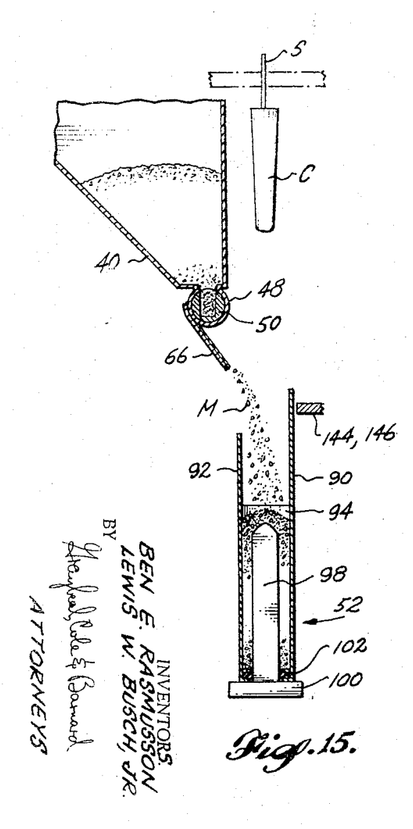
FIG. 15 is a somewhat diagrammatic view of the storage means, valve means, and particulate material container of the mechanism shown in FIGS. 1–5, and further illustrating an arrangement thereof with respect to a bank of confections at a time in the dry coating cycle when a metered amount of dry material is being fed to the container and the container is in its lowermost position.

The tubular valve means 46 functions to deliver from the hopper 40 a metered amount of dry particulate material M to the utilization means for the material, in this case the container of the dry coater mechanism, which container is generally designated at 52, and is described in more detail below. To perform its function, the rotatable tubular valve member 50 comprises a first end 54 which is formed with an elongate, radially facing slot 56, in part underlying the hopper 40 and in open communication therewith when the tubular valve member 50 is in a first rotational position, as shown at FIGS. 6 and 12, for example. The rotatable tubular valve member 50 is formed so as to be axially open throughout, and the said radial slot 56 thereof is in direct commuication with a second, radially oppositely facing slot means 58 at the second end 60 thereof, with the walls of the slot means 58 diverging in a manner shown at FIGS. 8 and 14, for example, to facilitate gravitational discharge of the particulate material therefrom. Tubular outer casing 48, in the second end 62 thereof which overlies the container 52, comprises a generally downward facing slot-like opening 64, and a deflector plate 66 is mounted to the said second end 62 of tubular outer casing 48 to aid in delivery of the particulate material into the elongate, narrow container assembly 52.

At the extremity of the first end 54 of the rotatable tubular valve member 50, the valve member 50 mounts a pinion gear 70, by means of which it is rotatable to and from the first rotational position shown at FIGS. 6 and 12, and the second rotational position shown at FIG. 9. Said first end 54 of the rotatable tubular valve member 50 also mounts at the extremity of the first end thereof a means for supplying a pressurized pneumatic medium axially of the tubular valve member 48, such as pressure hose 74 and hose coupling 76. Mounted to the end of hopper 40, as shown in FIGS. 1 and 2, is a support plate 78 and a double-acting pneumatic cylinder 80 which reciprocates a rack gear 82 in engagement with pinion gear 70 for effecting rotational movement of the tubular valve member 50 to and from the above-mentioned first and second rotational positions.

To facilitate flow of the pneumatic medium and contained material M axially through the tubular valve member 48 when the end openings thereof are rotated to a closed position (FIGS. 9-11), the second end 62 of casing 48 is extended beyond the second end 60 of valve member 48 and axially receives a retainer sleeve 82 which has an end placed mesh strainer 84 permitting flow of only the pneumatic medium out of the closed end 60 of the valve member 48, such pneumatic medium outflow being through radially facing openings 85, 86 in the retainer sleeve 82 and the casing end 62, as indicated by the arrows designated 87 (FIG. 9). Retainer sleeve 82 is removably held in the casing end 62 by a friction ring 88 (FIG. 6), and an enlarged, knurled end 89 (readily accessible from the side of the equipment on which the mechanism is installed, note FIG. 2) permits easy withdrawal of the sleeve 82, as for cleaning of it and the tubular valve means 46.

The operating sequence of the tubular valve means 46, involving cyclic acuation of the pneumatic cylinder 80 and cyclic delivery of pneumatic medium through pressure hose 74, will be considered in more detail below, as part of the overall operating sequence of the dry coater section of the equipment.

The dry coater container 52 is comprised of side walls 90, 92 and end walls 94, 96, together with a retractable plug means 98 mounted on a separate support 100, with the bottom structure of the container 52 including rubber or like resilient plastic (e.g., nylon) seal means 102 snugly engaging the plug means 98 and also snugly engaging the respective sides and ends 90–96 of the container, as by seating within inwardly facing flange members 104, 106, as best shown in FIGS. 4 and 6. With respect to the frangmentary illustrations of the container 52 as presented by FIGS. 4 and 5, it will be understood that the end of the container not shown is symmetrical with the illustrated end portions thereof. Standing out from end members 94, 96 of the container 52 are mounting flanges 108, 110, carrying one end yieldable means such as tension springs 112, 114, with the other ends of the springs 112, 114 being in turn anchored to upstanding eyes 116, 118 near the ends of support plate 100, the function of the spring means 112, 114 being to maintain the plug means 98 normally fully telescoped within the container 52.

As best shown in FIGS. 1 and 2, the dry coater container 52 and associated mechanism mount on the conventional Vitaline equipment by means of upright frame members 120, 122, arranged laterally at the respective sides of and spanning the main frame 10 and extractor bar conveyor section 20. Vertical movement of the portions of container 52 integral with mounting flanges 108, 110 is occasioned by actuation of pneumatic cylinder 124, directly applying upward force to mounting flange 110 through rack 126 and bracket 128 (the bracket 128 passing through slot 130 in upright 120), and also acting on mounting flange 108 through rack 126 engaging pinion 132 on shaft 134 journaled in the uprights 120, 122, the other end pinion 136 in turn engaging rack 138. Bracket 140 on rack 138 passes through slot 142 of upright 122 to a point of contact with said mounting flange 108.

As discussed further below, the initial upward movement of the container 52 involves movement of both the external walls of the container and the plug means 98 thereof, the said plug means 98 moving upwardly along with the external container faces by action of the tension springs 112, 114. However, as the external faces of the container continue to move upwardly under the action of pneumatic cylinder 124, and as the top of the plug means 98 closely approaches the lower ends of the superposed bank of confections C (note FIG. 16), the upward movement of the plug means 98 is halted while the external walls of the container 52 continue upwardly to the point where the confections C become fully immersed in the bed of particulate material M within the container 52 (note FIG. 17). Such interruption of the upward movement of the plug means 98 without interruption of the upward movement of the rest of the container 52 is caused by the ends of support plate 100 contacting a pair of vertically adjustable stop elements 114, 146, mounted to face inwardly on respective uprights 122, 120, the manner of such contact being best shown in FIG. 3. Said FIG. 3 further shows the external faces of the container 52 in their uppermost position, with the yieldable means 112, 114 in an extended state.

An important feature of the dry coater assembly of the present invention is that the entire assembly can occupy only a very small portion of the line of travel of the confections C. The narrowness of the assembly in its dimension perpendicularly of such line of travel is perhaps best observed in FIG. 1, where it will be observed that the width dimension of the plug means 98 is about the same as or slightly greater than the corresponding width dimension of the confections C, e.g., about 1 inch. The other components of the dry coater container 52 are similarly narrow along the line of travel of the confections C. In a typical installation, for example, the container 52 is only about 2½ inches wide and the entire dry coater assembly including the side supports 120, 122, is only about 4 inches wide, and is installable on the confection forming equipment with the only substantial modification necessary in the basic equipment being the replacement of the conventional drip board with a slightly shorter drip board 28. This capability as to installation of the dry coater mechanism of the present invention on existing in-line confection forming equipment without substantial modification of the confection forming equipment is to be distinguished from the installation requirements of conventional agitator type dry coaters, such as the Fulton dry coater, where the dry coater must occupy a dimension of some 10 to 14 inches along the path of travel of the confections, and its installation often requires corresponding extension of both the main frame and the extractor bar conveyor section of the equipment, an obviously expensive modification requirement.

Figure 19:
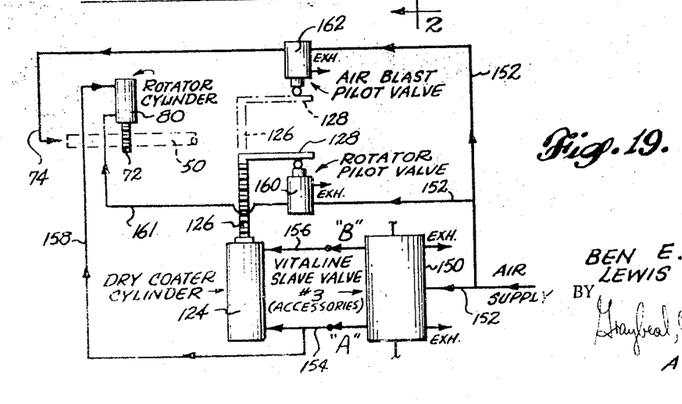
FIG. 19 is a schematic view of the pneumatic control system for the material feeding and dry coater mechanism shown in FIGS. 1–18.

FIG. 19 is a schematic showing of the control components of the dry coater and material feeding mechanism shown in FIGS. 1–18. The basic Vitaline equipment typically employ a pneumatic control system, including a four way slave valve No. 3 (designated 150 in FIG. 19), to which is connected an air supply line 152, and from which pressurized air is delivered at an output port A during the initial portion of dwell periods of the conveyors 16 and 22 and at an output port B during the final portion of the conveyor dwell periods and during movement of the conveyors. The components or optional accessories of the machine which operate during the conveyor dwell periods, such as the defrost cylinder, the stick insertion cylinder, and the filler valve actuating cylinder, are thus controlled by connection to these output ports A and B. To operate the dry coater mechanism of the present invention, the dry coater cylinder 124 is also parallel connected to control ports A and B by lines 154, 156, so that the dry coater container 52 is raised and lowered during each conveyor dwell. Such lowered positions of rack 126 and its bracket 128 are shown by solid line in FIG. 19, and the raised positions thereof are shown by broken line.

Actuation of the rotator pneumatic cylinder 80, as shown in FIG. 19, is accomplished by connection of one side thereof to output port A through line 158, and by connection of the other side thereof to air supply line 152 through a normally closed rotator pilot valve 160 and line 161. Rotator pilot valve 160 is positioned inboardly of support 120 (note FIG. 2), to be opened by bracket 128 when the dry coater cylinder 124 is in its down position. When the rotator pilot valve 160 is open, rotator cylinder 80 is maintained in a retracted condition and the rotatable tubular valve member 50 is in the first rotation position shown at FIGS. 6 and 12. When the dry coater cylinder 124 is actuated and moves the bracket 128 upwardly from the rotator pilot valve 160, the valve 160 closes and air exhausts from cylinder 80 through the rotator pilot valve 160 while air from output port A through line 158 actuates rotator cylinder 80 so that rack 82 thereof moves to its extended position, moving the rotatable valve member 50 from its first rotational position to its second or closed rotational position, as shown at FIG. 9. As will be apparent, the rotatable tubular valve member 50 continues to be in such second rotational position until the dry coater cylinder 124 again becomes retracted and the bracket 128 returned to its lowermost position, again opening the rotator pilot valve 160.

The control means for the air blast delivered axially of the valve mechanism 46 through line 74 comprises a normally closed air blast pilot valve 162 connected to the air supply line 152, with such valve 162 being positioned on the upright 120 (again note FIG. 2) to be momentarily opened by the bracket 128 when in its uppermost position, as shown by broken line in FIG. 19.

Figure 16:
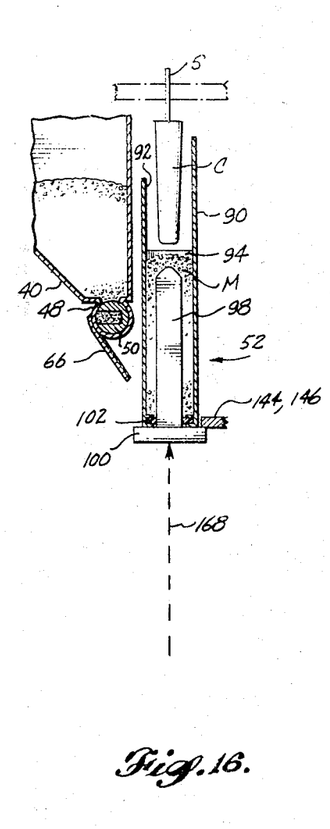
FIG. 16 is a view like that of FIG. 15, showing the material container partially raised.
Figure 17:
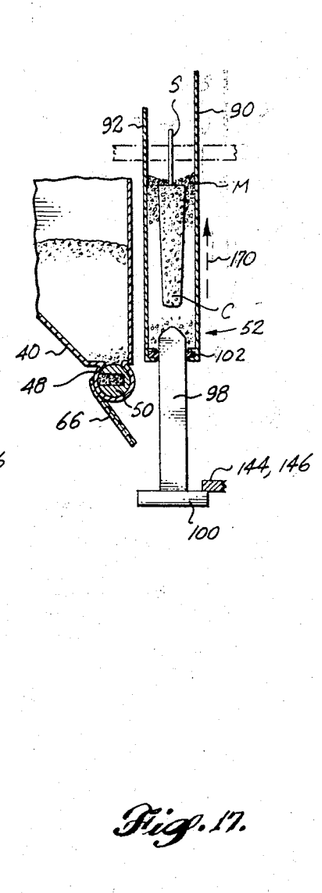
FIG. 17 is a further view like FIGS. 15 and 16, showing the material container in its fully raised position, with the plug means retracted relatively downwardly therein.
Figure 18:
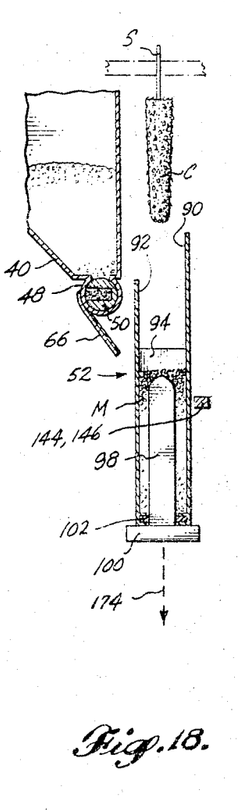
FIG. 18 is a further view like the views of FIGS. 15–17, showing the material container in a partially lower position.

With the pneumatic control system shown at FIG. 19 in view, the overall sequence of operation of the feeding mechanism and dry coater assembly is as follows. Assuming the confection forming equipment is in operation, and successively producing banks of confections C which are being conveyed in a stepwise fashion along a path of travel horizontally below the extractor bar conveyor section 20 (as diagrammatically indicated in FIG. 1 by arrow 164), it will be understood that each bank of confections emerges from and moves past the chocolate dip tank 26 with a newly applied, moist, semi-fluid exterior coating. As a dip-coated bank of confections C moves into superposed position with respect to the dry coater container 52, the dry coater container 52 is maintained in a down position (by air through line 154), and the valvular material feeding mechanism 46 is in its fill-discharge position shown in FIG. 6 (also note FIG. 15). Upon initiation of the next conveyor dwell, air through line 154 actuates dry coater cylinder 124 to raise rack 126 and container 52, with the initial movement of rack 126 closing the rotator pilot valve 160, which in turn causes actuation of rotator cylinder 80 to extend rack 72 and rotate valve member 50 to its closed position, as shown at FIG. 9. Movement of the rack 72 to accomplish this valve rotation is diagrammatically indicated in FIG. 9 by arrow 166. In the course of its upward movement (as indicated in FIG. 16 by arrow 168), container 52 progresses to a point where the ends of support plate 100 encounter stop elements 144, 146. The instant of such encounter is illustrated at FIG. 16. At this point, the upper face of the plug means 98 is disposed contiguously below but in slightly spaced relation to the lower faces of the confections C, and the lower faces of the confections C are just entering or just about to enter the material M. As rack 126 and the brackets 128, 140 continue to move upwardly, the external walls of the container 52 also continue to move upwardly as diagrammatically indicated by arrow 170 in FIG. 17, while the plug means 98 undergoes no further upward movement and is thus relatively stationary with respect to the confections C and relatively withdrawn or retracted in relation to the walls of the conainer 52. During immersion of the confections C the space within the material M previously occupied by the plug means 98 is for the most part progressively occupied by the confections C, and the confections C become substantially fully immersed within the material M at the uppermost point of travel of the side and end walls of the container 52 (again note FIG. 17 and also FIG. 3, illustrating the relative positions of the dry coater components and the bank of confections at the instant when the container faces are at their uppermost position of travel). At such upper most point of travel, and a shown at FIG. 19, the bracket 128 encounters and opens air blast pilot valve 162, causing a blast of air to be delivered through hose 74 axially into the rotatable valve member 50, as diagrammatically indicated by arrow 172. Such blast of air in its transit through the tubular valve member 50 causes transfer of the particulate material M therein from its position beneath the hopper 40 to a position directly above the deflector plate 66. After transmitting the valve member 50, the air exhausts through screen 84 in sleeve 82 and thence to the atmosphere, as diagrammatically indicated at 87. The air blast delivered through hose 74 can be of any suitable short duration, a blast of about one-half second or less being sufficient for the material transfer purpose indicated, for example.

At about the instant rack 126 reaches its uppermost position, the accessory slave valve 150 shifts condition to relieve output line 154 and deliver air to line 156 from output port B, initiating downward movement of the rack 126 and the container 52 outer walls. As such downward movement progresses, tension springs 112, 114 function to return the plug means 98 into fully telescoped position within the material M in container 52 as the support plate 100 leaves the stop members 144, 146, and the downward movement of the rack 126 and container 52 continues (as diagrammatically indicated in FIG. 18 by arrow 174) until bracket 126 and the container 52 again reach their lowermost position (FIG. 15), and rotator pilot valve 160 is again opened by bracket 126. With the reopening of pilot valve 160, rotator cylinder 80 is actuated to retract its rack 72 (as diagrammatically indicated in FIG. 12 at 176), restoring the tubular valve member 50 to its first rotational position, whereupon additional material M flows into the radial slot 54 of the member 50 as diagrammatically indicated by arrows 178 and the material M previously deposited in the radial slot 58 of the tubular member 50 gravitationally discharges therefrom onto the deflector plate 66 and thence into the container 52, such manner of discharge being diagrammatically indicated in FIGS. 12 and 14 by arrows 178 (also note FIG. 15). An amount of material M is thus cyclically delivered to the container 52 to provide makeup for the material M coated onto the confections C.

With the dry coating cycle thus ended and various dry coater components and control elements thus restored to their initial condition, the confection forming equipment then proceeds through a cycle of conveyor movement, and the dry coater sequence is reinitiated and repeated during the next conveyor dwell period to coat the next successive bank of confections, and so on.

Figure 20:
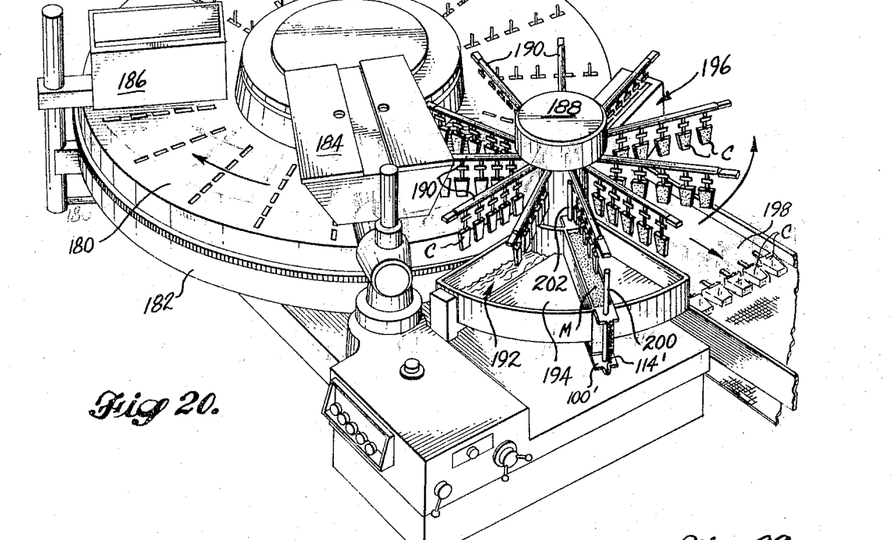
FIG. 20 is a fragmentary view of a somewhat simplified nature, showing a modified form of dry coater mechanism characteristic of the invention, installed on a rotary type automated frozen confection forming equipment.

FIGS. 20–23 illustrate a modified form of the invention, wherein the dry coater assembly is adapted for use on and installed on a so-called rotary type automated confection forming equipment. For purposes of illustrating this adaptation of the invention, the basic type of equipment selected, and as illustrated in simplified form in FIG. 20, is a so-called Gram Model RIA—No. 5, marketed by Brodrene Gram A/S, Vojens, Denmark. As known by those in the art, the Gram type machine conventionally comprises a mold ring 180, rotated in a clockwise manner over a brine tank 182, with a superposed filling apparatus 184, stick loader assembly 186, and remover or extractor assembly 188, which is rotated in a counter-clockwise direction and by successive vertical movement of each radially arranged arm 190 functions to withdraw the formed frozen confections from the mold ring, then successively move the same to and through a dip cycle at a cholocate coating station 192, thence over a chocolate recovery table 194 to a bagger or wrapper 196, from which the confections are discharged by a conveyor mechanism 198. In accordance with the present invention, an immersion type dry coater assembly is installed to extend radially of one position of the arms 190 of the extractor assembly and replaces a portion of the chocolate recovery table. In this form of mechanism, since the formed confections can readily be made to move vertically downward in the course of their movement away from the chocolate coating station while depending from the arms 190 of the extractor assembly 188, the dry coater container, generally indicated at 52', is installed with the external side and end faces thereof stationary relative to the chocolate recovery table 194. Except as otherwise indicated, the structure of the dry coater container 52' is the same as the dry coater container 52 in the earlier discussed form of the invention, and is similarly supplied each coating cycle with a metered amount of particulate material M through any suitable feeding mechanism such as the feeding mechanism shown at FIGS. 6–14. Only a fragmentary portion of such feeding mechanism is shown in FIG. 20, specifically outer casing 48 and rotatable tubular valve member 50 thereof, for clarity of illustration of the other dry coater components.

Figure 21:
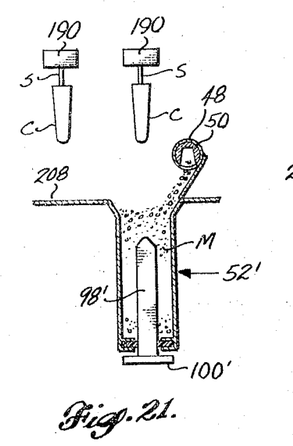
FIG. 21 is a somewhat diagrammatic showing of the material container and associated equipment of the mechanism shown in FIG. 20, the instant of operation illustrated by FIG. 21 being with a given bank of confections in an upper position and the plug means fully telescoped within the material container.
Figure 22:
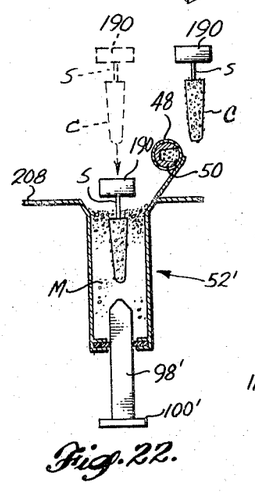
FIG. 22 is a further view like that of FIG. 21, showing the instant of operation of the mechanism shown in FIG. 20 wherein the given bank of confections has been lowered into the material container and the plug means has been retracted downwardly within the container.
Figure 23:
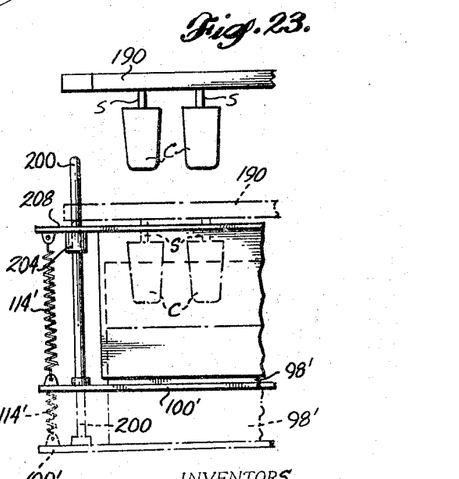
FIG. 23 is a fragmentary, somewhat simplified view in side elevation of the dry coater mechanism and associated equipment shown in FIGS. 20–22, to further illustrate the elemental arrangements during the operational sequence thereof, with the elements at the instant of operation shown at FIG. 21 being shown in FIG. 23 in solid line, and with such elements at the instant of operation shown in FIG. 22 being shown in FIG. 23 by broken line.

As is earlier indicated, relative downward movement of each bank of confections C into the dry coater container 52' is accomplished in the equipment shown at FIG. 20 by cyclic downward movement of the various arms 190 of the extractor assembly 188 at the dry coater station. The uppermost position of the confections C with respect to the dry coater container 52' is shown at FIG. 21, and the lowermost position thereof is shown at FIG. 22.

Support plate 100' for retractable plug means 98' of the container 52' mounts actuator means to be contacted by the arms 190, such as one or more actuator rods, a pair of such actuator rods 200, 202 being shown. Rods 200, 202 extend through respective guide sleeves, one of which is shown at 204, arranged endwise in top plate 208 of the container 52', and are contacted and depressed by each arm 190 in its downward course of travel and in turn effect relatively downward retraction of the plug means 98' within the container 52'. End placed yieldable means, such as tension springs, one of which is shown at 114', maintain tension between the support plate 100' and the top plate 208 so that the normal position of the plug means 98' within the container 52' is with the plug means 98' fully telescoped therein. As will be observed in FIGS. 22 and 23 while this modification of the invention involves a stationary mounting for the external walls of the container 52', the correlative movement of the plug means 98' with respect to the confections C, and the relative movement of both with respect to the particulate material M within the container 52' are the same as occurs with respect to the movable container 52 in the earlier discussed form of the invention. As will be also apparent, the material feeding sequence employed with respect to the container 52' is the same as the feeding sequence in the form of the invention earlier discussed, with material M being fed into the container 52' while the associated bank of confections to be coated is in an uppermost position (FIG. 21), and with the material feed cut off during the movement of the confections C into and out of the material M in the container (FIG. 22).

From the foregoing, other modifications and variations as to the dry coater and feeding mechanisms, and the applications thereof, will be apparent to those skilled in the art. As to the nature of the confection or the like, it will be understood that dry coating can involve either frozen or non-frozen confections or the like, and whether or not such has a newly formed, moist, previously applied coating material. While the mechanism shown has been illustrated in conjunction with a frozen confection of the type having an imbedded stick, it will also be understood that sticks are simply one form of holding means for such confection products, and that removable pins or the like can also be employed, such as where the confections or the like is candy, cookies, dried fruit, coated apples, fish sticks, chicken legs, Christmas tree balls or the like. As to the nature of the dry particulate material applied, it will be likewise understood that such can be of any suitable constituency, such as chopped nuts, cookie crumbs, peanut brittle particles, coconut shreds, or the like. As will also be evident, and while the mechanisms specifically described show but a single dry coater stage following a dip coater stage, other variations as to coating sequence can be employed, such as a dry coater followed by a dip coater followed by a second dry coater, simply by way of further example. As to the relative movement of the particulate material container, the plug means, and the confections, it will be further evident that the important consideration is the synchronous, juxtaposed movement of the confections and plug means relative to the container carrying the bed of particulate material, and that such relative movement can involve a degree of vertical movement of all of these elements if desired, rather than maintaining any one vertically stationary (as the confections are in the arrangement shown in FIGS. 1–19, or the material container is in the arrangement shown in FIGS. 20–22). The mechanisms of the invention are also readily adaptable to operation with confection forming equipment containing any number of confections per bank, rather than the six-bank equipments shown. As will also be apparent, the material container means and the valvular mechanism for handling same can be employed in conjunction with known devices for maintaining a more constant level of material and more uniform flow of material, such as vibrators, if desired. Apparent also, will be a number of variations as to feeding mechanisms for delivering particulate material to the container means of dry coater mechanisms characteristic of the invention, such as a screw feed mechanism, a vibrator type feed mechanism, or simply a gravity feed mechanism in the case where sufficient vertical space above the container means is available for gravitational discharge into the container means from a hopper type storage means or the like. Similarly, it will be evident that the tubular valve means characteristic of the invention, such as shown at FIGS. 6–14, has utility for effecting more or less horizontal transfer of metered amounts of a wide variety of particulate materials to types of utilization mechanisms other than an immersion type dry coater, as when used for delivering measured amounts of small articles such as screws, pellets, beads or the like to a packaging station or the like.

From the foregoing specific discussion of certain typical embodiments of the invention and specific reference to certain modifications thereof, various other modifications, adaptations, and areas of application of the invention will be apparent to those skilled in the arts to which the invention is addressed, within the scope of the following claims.

What is claimed is:

1. In a dry coater for applying dry, particulate material to a body by momentary downward immersion of the body into a bed of the material; container means for the material, including:
    (a) upright side and end walls joined by a bottom portion;
    (b) plug means passing vertically through said bottom portion and standing upwardly therefrom within the space between said side and end walls;
    (c) support means for said plug means, mounting the same to be movable with respect to said side and end walls; and
    (d) coupling means acting between said walls and such plug means and normally maintaining said plug means in an uppermost position within the space between said walls while permitting relative downward movement of said plug means within said space on the occasion of immersion of such body into such bed of material.

2. In a dry coater for applying dry, particulate material to a body by momentary downward immersison of the body into a bed of the material; container means for the material, including:
    (a) upright side and end walls joined by a bottom portion;
    (b) plug means passing vertically through said bottom portion and standing upwardly therefrom between and in spaced relation to said side and end walls;
    (c) resilient seal means between said plug means and said walls and at least in part making up said bottom portion;
    (d) support means for said plug means, arranged below the said bottom portion of the container means and mounting the plug means to be movable with respect to said side and end walls and said seal means; and
    (e) yieldable means acting between said walls and such plug means and normally maintaining said plug means fully telescoped within the space between said walls while permitting relative downward movement of said plug means within said space on the occasion of immersion of such body into such bed of material.

3. In a dry coater for applying dry, particulate material to a body by momentary downward immersion of a bank of confections or the like into a bed of the material; container means for the material, including:
    (a) upright side and end walls joined by a bottom portion;
    (b) plug means standing upwardly from said bottom portion in spaced relation within said walls, the said plug means being about the same width as the width of the confections or the like, and being of a length to span the bank of confections;
    (c) resilient seal means between said plug means and said walls and at least in part making up said bottom portion;
    (d) support means for said plug means, arranged below the said bottom potrion of the container means and mounting the plug means to be vertically moveable with respect to said walls; and
    (e) spring means acting between said walls and such plug means and normally maintaining said plug means fully telescoped within the space between said walls while permitting relative downward movement of said plug means within said space on the occasion of immersion of such bank of confections or the like into such bed of material.

4. A dry coater having means according to claim 3, wherein the width of said plug means is about one inch, and the width of said container means between said side walls is about two and one-half inches.

5. Dry coating mechanism for applying dry, particulate material to a body by momentary downward immersion of a bank of confections or the like into a bed of the material, said mechanism comprising:
(1) container means for the material, including
  (a) upright side and end walls joined by a bottom portion,
  (b) plug means standing upwardly from said bottom portion within the space between said walls, and having substantially parallel side walls of a width about the same as the width of said bank of confections or the like,
  (c) support means for said plug means, mounting the same to be vertically movable relative to said walls, and
  (d) means normally urging said plug means in an uppermost position within the space between said walls while permitting relative downward movement of said plug means within said space;
(2) holder means for said bank of confections or the like;
(3) means causing relative downward movement of said bank of confections or the like into the material in said container means; and
(4) means causing downward movement of said plug means relative to said walls while the confections or the like are moving relatively downwardly in the material.

6. Dry coating mechanism for applying dry, particulate material to a body by momentary downward immersion of a bank of confections or the like into a bed of the material, said mechanism comprising:
(1) narrow, elongate container means for the material, including
  (a) upright side and end walls joined by a bottom portion,
  (b) plug means standing upwardly from said bottom portion within the space between said walls and having substantially parallel side walls of a width about the same as the width of said bank of confections or the like,
  (c) support means for said plug means, mounting the same to be vertically movable relative to said walls, and
  (d) means normally urging said plug means in an uppermost position within the space between said walls while permitting relative downward movement of said plug means within said space;
(2) holder means for said bank of confections or the like;
(3) means causing relative movement of said bank of confections or the like into and out of the material in said container means; and
(4) means causing downward then upward movement of said plug means relative to said walls and in equispaced relation to the confections or the like while the latter are in contact with the bed of material, so that when fully immersed in the material the confections or the like occupy space therein which is for the most part occupied by said plug means when in its uppermost position with respect to said walls.

7. In combination with an automated confection forming machine producing successive banks of newly-formed, moist-surfaced confections which after being formed are conveyed along a generally horizontal path of travel in step-wise fashion with alternating movement and dwell periods; a dry coating mechanism according to claim 6, including means actuated during each such dwell period to first raise and then lower the walls of said container means into and out of surrounding relation with respect to a bank of confections while such bank of confections remains stationary.

8. In combination with an automated confection forming machine producing successive banks of newly-formed, moist-surfaced confections which after being formed are conveyed along a path of travel in step-wise fashion with alternating movement and dwell periods; a dry coating mechanism according to claim 6, including means actuated during each such dwell period to first lower and then raise each bank of confections into and out of surrounded relation with respect to the said walls of the container means while such walls remain stationary.

9. In combination with an automated confection forming machine producing successive banks of newly-formed, moist-surfaced confections which after being formed are conveyed along a path of travel in step-wise fashion with alternating movement and dwell periods; dry coating mechanism for applying dry, particulate material successively to each bank of confections, said coating mechanism comprising:
(1) container means for the material, including
  (a) upright side and end walls joined by a bottom portion,
  (b) plug means standing upwardly from said bottom portion within the space between said walls,
  (c) support means for said plug means, mounting the same to be vertically movable relative to said walls, and
  (d) means normally urging said plug means in an uppermost position within the space between said walls while permitting relative downward movement of said plug means within said space;
(2) means causing relative downward then upward movement of said bank of confections into and out of the material in said container means during each such dwell period;
(3) means causing movement of said plug means relative to said walls but not relative to said bank of confections while the said bank of confections is in the bed of material; and
(4) material feeding means delivering a quantity of make-up material to said container means upon return of said bank of confections to a relatively upward position with respect to said container means.

10. The combination of claim 9, wherein said material feeding means comprises:
(a) an elongated, rotatable tubular member arranged to be communicable at its first end with a material storage means disposed at one side of said banks of confections and arranged at its second end to be in discharge relation with said container means at a first rotational position, the said tubular member being axially open throughout and radially open at the said first and second ends thereof;
(b) means selectively rotating said tubular member out of said first rotational position to close off the radial openings thereof;
(c) means momentarily delivering a blast of a pneumatic medium axially into the said first end of the tubular member while the tubular member is out of said first rotational position to cause the particulate material in the said first end to the tubular member to move to the said second end thereof;
(d) means arranged in the said second end of the tubular member permitting exhaust of pneumatic medium without substantial loss of particulate material therefrom; and
(e) means selectively rotating said tubular member to said first rotational position to cause discharge of the material in the said second end thereof into said container means.

11. Mechanism for applying a coating of dry, particulate material to successive banks of frozen confections or the like of the type having an imbedded holder means and a new formed, moist, semi-fluid exterior coating while such confections are being held by means grasping said holder means with the holder means in an upper position and while being successively conveyed along a path of travel, said mechanism comprising:

(a) an upwardly open container for said particulate material, said container being situated below and transversely spanning said paths of travel;

(b) means for delivering particulate material into said container to maintain the container nearly full of the particulate material;

(c) plug means extending upwardly from the bottom of and forming a part of said container, said plug means having a horizontal dimension transverse to said paths of travel which spans the said paths of travel and having a horizontal dimension parallel to said paths of travel which is substantially the same as the corresponding dimension of said bank of confections;

(d) means mounting said plug means within and below said container to be telescopically movable vertically therewithin;

(e) seal means situated in the bottom of said container and substantially laterally surrounding said plug means;

(f) spring means acting between said container and said plug means to normally urge said plug means to a fully telescoped position within said container;

(g) means causing relative movement between said container and each bank of confections successively so that at a point along the path of travel of each such confection the confection is positioned entirely within the container; and (h) means causing progressive withdrawal of said plug means downwardly within said container simultaneously with progressive movement of each bank of confections into the said container, the relative movement of the bank of confections, the container and the plug means being such that particulate material in the container is in part initially displaced by the plug means, then as the bank of confections moves into the particulate material in the container the progressive relative downward withdrawal of said plug means from displacement of particulate material in the container is immediately followed by a displacement of the particulate material by the bank of confections so that at the downwardmost position of the bank of confections in the container most of the space in the container which was initially occupied by said plug means is then occupied by said bank of confections and the particulate material in the container closely surrounds and contacts the surface of each such confection, but without each confection laterally moving the particulate material to any great extent.

12. Apparatus for periodically feeding a metered amount of particulate material from a storage means at a first location to a utilization means at a second location, said apparatus comprising:

(a) an elongate, rotatable tubular member arranged to be communicable at its first end with said storage means at a certain rotational position and arranged at its second end to be in discharge relation with said utilization means at such rotational position, the said tubular member being axially open throughout and radially open at the said first and second ends thereof;

(b) means selectively rotating said tubular member into and out of said certain rotational position;

(c) means momentarily delivering a blast of a pneumatic medium axially into the said first end of the tubular member while the tubular member is out of said certain rotational position to cause the particulate material in the said first end to the tubular member to move to the said second end thereof; and (d) means arranged in the said second end of the tubular member permitting exhaust of the blast of pneumatic medium without substantial loss of particulate material from said second end of the tubular member.

13. A feeding mechanism for delivering a dry, particulate material from a storage means to an upwardly open utilization means such as a container or the like situated below and generally horizontally offset from said storage means, said mechanism comprising:

(a) an elongate, generally horizontally extending tubular valve means arranged so that a first end thereof can receive particulate material from said storage means and arranged with the second end thereof overlying said utilization means to discharge particulate material thereto, said tubular valve means comprising:

(1) a nonrotative outer casing having at its second end a downwardly facing opening situated above said utilization means, (2) a rotatable, axially open, tubular valve member concentrically arranged within said nonrotative tubular casing and comprising a slot-like opening at said first end, positioned to be in or out of registry with the opening at said casing first end depending upon the rotational position of said tubular valve member in said casing, the said tubular valve member further comprising a second slot-like opening at said second end thereof, positioned to be in or out of registration with the opening at said casing second end depending on the rotational position of said tubular valve member in said casing, the arrangement of said member openings and said casing openings respectively establishing such in register or out of register simultaneously, being in register at a first rotational position and out of register at a second rotational positon;

(b) means supplying a pressurized pneumatic medium to said first end of said tubular valve member;

(c) means for selectively controlling the delivery of such pressurized pneumatic medium into said first end of said tubular valve member;

(d) means for sequentially moving said tubular valve member into and out of said first rotational position wherein particulate material from said storage means fills said first end thereof through its then upwardly facing opening and particulate material in said second end thereof is discharged through its then downwardly facing opening into said utilization means, and respectively out of and into its said second rotational position wherein the said openings thereof are closed off; and (e) means momentarily actuating such pneumatic medium control means to deliver such medium into said first end of said tubular valve member and transfer the particulate material therein from the said first end to the said second end thereof when said tubular valve member is in its said second rotational position.

14. In an automated confection forming equipment involving step-wise conveyance of successive banks of confections to an immersion type dry coater assembly and the immersion of each bank of confections into a bed of dry particulate material in a container means, and further involving a tubular pneumatic feeder mechanism periodically actuated to feed make-up material from a separated location to said container means; a pneumatic control system for such coater assembly, comprising:

(a) a pneumatic cylinder actuated at the beginning of each conveyance dwell period to move said container means upwardly for immersion of a bank of confections therein;

(b) a pneumatic cylinder means actuated upon initial movement of said container means to close off the flow path from said material feeder means to said container means;

(c) means actuated upon movement of said container means into an uppermost position to deliver a blast of pneumatic medium axially of said feeder mechanism and transfer the quantity of make-up material therein from such separated location to a location above said container means; and (b) means actuated upon return of said container means to a lowermost position to reopen the flow path from said material feeder means to said container means and cause discharge of said make-up material into said container means.

15. Dry coater mechanisms, combination thereof with automated forming machines for confections and the like, and material metering and feeding mechanisms therefor, substantially as shown and described.

No references cited.

CHARLES A. WILLMUTH, *Primary Examiner.*

R. I. SMITH, *Assistant Examiner.*